Patented Oct. 25, 1949

2,485,712

UNITED STATES PATENT OFFICE

2,485,712

NITROPHENYLOXYPOLYALKOXYALKYL ETHER AND A COMPOSITION OF IT AND A PLASTICIZABLE ORGANIC SUBSTANCE

George L. Doelling, St. Louis, and Kenneth H. Adams, Fenton, Mo., assignors to Mississippi Valley Research Laboratories, Inc., St. Louis, Mo., a corporation of Missouri No Drawing. Application June 6, 1946, Serial No. 674,936

6 Claims. (Cl. 106—188)

This invention relates particularly to nitrophenyl alkyl ethers of polyalkylene glycols.

This application is a continuation-in-part of our copending application, Serial No. 656,785, filed March 23, 1946 (Patent No. 2,450,272).

Among the objects of this invention may be noted the provision of new and useful nitrophenyl alkyl ethers of polyalkylene glycols; and the provision of such ethers useful as high boiling solvents, and as plasticizers for plastic and polymeric materials. Other objects will be in part apparent and in part pointed out hereinafter.

The invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

According to the present invention new and useful nitrophenyl alkyl ethers of polyalkylene glycols are provided. More particularly the invention relates to the nitrophenyl alkyl ethers of polyalkylene glycols having the following general structural formula:

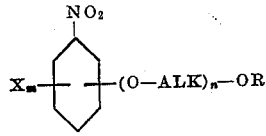

in which ALK represents a divalent aliphatic hydrocarbon radical containing not more than four carbon atoms, R represents an aliphatic hydrocarbon radical containing not more than eight carbon atoms, X represents a halogen such as chlorine, fluorine and bromine, $n$ represents a small whole number greater than one, and $m$ represents zero or an integer not greater than four. The halogen or (O—ALK)$_n$—OR substituents may be substituted for the hydrogen in any position in the nitrobenzene nucleus not otherwise occupied. The ALK radical is preferably a lower alkylene radical, such as ethylene, propylene or butylene.

The ethers represented by the foregoing formula include nitrophenyl alkyl ethers of polyalkylene glycols which also have one or more lower alkyl groups such as methyl, ethyl or isopropyl substituted for hydrogen in the benzene ring. The nitro compounds of the present invention may be reduced if desired to amino compounds and amides or other derivatives may be made from them.

Among the ethers of the present invention are the nitrophenyl ethyl ether of triethylene glycol, the nitrophenyl hexyl ether of diethylene glycol, the nitrophenyl methyl ether of diethylene glycol, the chloronitrophenyl ethyl ether of triethylene glycol, the dichloronitrophenyl ethyl ether of triethylene glycol, the chloronitrophenyl ethyl ether of diethylene glycol, the bromonitrophenyl ethyl ether of diethylene glycol, the chloronitrotolyl ethyl ether of diethylene glycol, the chloronitrophenyl hexyl ether of diethylene glycol, the trichloronitrophenyl ethyl ether of diethylene glycol, the dichloronitrophenyl ethyl ether of dipropylene glycol, and the 2-nitrophenyl ethyl ether of tetraethylene glycol.

The ethers of the present invention are valuable high-boiling solvents and plasticizers for plastic and polymeric materials.

The following examples illustrate the invention:

Example 1

The 4-chloro-2-nitrophenyl ethyl ether of diethylene glycol, having the formula:

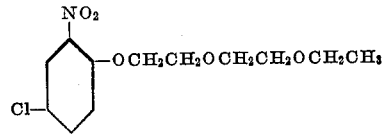

was made from 2,5-dichloronitrobenzene and diethylene glycol monoethyl ether.

|  | Weight | Mols |
|---|---|---|
|  | Grams |  |
| 2, 5-Dichloronitrobenzene | 64 | .33 |
| Diethylene glycol mono-ethyl ether | 202 | 1.50 |
| Potassium hydroxide (90% flakes) | 25 | .40 |

The 2,5-dichloronitrobenzene and the diethylene glycol monoethyl ether were charged into a 500 milliliter, 3-neck, round bottom flask equipped with a reflux condenser, a mechanical stirrer and an inlet tube for oxygen. The materials were heated to about 50° C. and then a slow stream of oxygen gas was bubbled continuously through the batch during the entire run to prevent reduction of the nitro group. At about 50° C. and with oxygen going through and the stirrer running, 4 grams of potassium hydroxide were added. The batch was stirred continuously and the temperature held at 52° C. to 58° C. The remainder of the alkali was added in small portions of 4 grams to 5 grams each during the reaction. The rate of addition of the alkali was at about the same rate as it was used up in the reaction, as determined by removing samples at intervals and titrating the free alkali present. A one-milliliter sample of the batch titrated from about 0.5 milliliter to 4.2 milliliters of 0.1 N HCl to phenolphthalein at various times during the run. Time of reaction was about 3½ hours.

The batch was worked up by diluting with water and extracting two or three times with benzene. The combined benzene extracts were washed several times with water. After removal of solvent, the product was distilled in vacuum. The product was 88.5 grams of an amber-colored oil which distilled at 170° C. to 175° C. at about 2 millimeters. The molecular weight of this product was determined by the camphor method and was found to agree with the theoretical value for the 4-chloro-2-nitrophenyl ethyl ether of diethylene glycol.

This product is useful as a solvent and plasticizer for cellulose esters and other polymeric products. Ten grams of cellulose nitrate and 10 grams of the 4-chloro-2-nitrophenyl ethyl ether of diethylene glycol were dissolved in 100 milliliters of a mixture of equal parts of absolute ethyl alcohol and n-butylacetate. This solution was then floated onto a glass slide and the solvent allowed to evaporate. A clear flexible film resulted which remained clear. This ether is highly compatible with cellulose nitrate. This ether is also compatible with cellulose acetate up to 50% or more of the weight of the cellulose acetate.

This 4-chloro-2-nitrophenyl ethyl ether of diethylene glycol was also tested for compatibility with polyvinyl butyral, cellulose acetate-butyrate, ethyl cellulose and vinyl chloride-vinylidene chloride co-polymers.

This ether used in the amount of 25% of the weight of polyvinyl butyral (Vinylite XYNC) gave a clear film. This ether used in the amount of 30% of the weight of vinyl chloride-vinylidene chloride co-polymer, gave a relatively flexible composition. When this ether was used in the amount of 25% of the weight of cellulose acetate-butyrate (16% butyryl) it gave a clear film. Also when incorporated with ethyl cellulose in the amount of 25% of the weight of the ethyl cellulose this ether was entirely compatible with the ethyl cellulose in this ratio.

Example 2

The 4-chloro-2-nitrophenyl ethyl ether of triethylene glycol, having the formula:

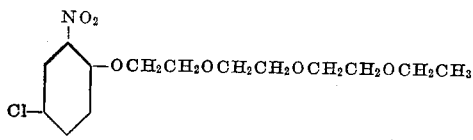

was made from 2,5-dichloronitrobenzene and triethylene glycol mono-ethyl ether. The precedure was practically the same as in Example 1. 105 grams of crude product were recovered which was vacuum distilled. The product was 98 grams of an oil boiling at 200° C. to 205° C. at about 3 millimeters. The molecular weight of this product checked very closely with the theoretical for this ether. The yield was about 88% of theory on the 2,5-dichloronitrobenzene.

Example 3

The 2,5-dichloro-4-nitrophenyl ethyl ether of triethylene glycol, having the formula:

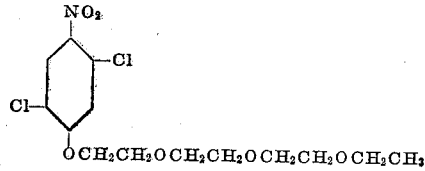

was made from 2,4,5-trichloronitrobenzene and triethylene glycol mono-ethyl ether. The procedure was pratically the same as Example 1. The product was an amber-colored oil boiling chiefly at 192° C. to 196° C. at about 2 millimeters. The molecular weight checked within less than 1% of the theoretical value (368) for this ether.

This 2,5-dichloro-4-nitrophenyl ethyl ether of triethylene glycol was tested with cellulose nitrate and gave a clear film when mixed with an equal weight of cellulose nitrate. This ether was also tested with cellulose acetate. A solution in 50% ratio was made up as follows:

| | |
|---|---|
| Cellulose acetate | grams__ 10 |
| 2,5-dichloro-4-nitrophenyl ethyl ether of triethylene glycol | grams__ 5 |
| Methyl Cellosolve | milliliters__ 40 |
| Acetone | do____ 40 |

This solution, when floated on a glass slide and the solvent evaporated, gave a clear film, showing that this product is compatible in the ratio of at least 50% of the weight of cellulose acetate.

Example 4

The 4-chloro-2-nitrophenyl methyl ether of diethylene glycol, having the formula:

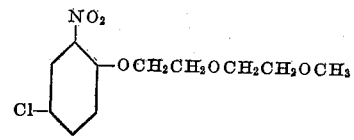

was made from 2,5-dichloronitrobenzene and diethylene glycol mono-methyl ether in a similar manner to Example 1. The temperature of reaction during most of the run was 64° C. to 65° C. and the time of reaction was about 4½ hours. From 100 grams of 2,5-dichloronitrobenzene 133 grams of crude product resulted. On distilling under vacuum this gave a yellow oil boiling at 168° C. to 172° C. at about 2 millimeters. The molecular weight was determined and it agreed very closely with the theoretical value for this compound.

This 4-chloro-2-nitrophenyl methyl ether of diethylene glycol was tested for compatibility with cellulose nitrate and cellulose acetate. It gave a clear, flexible film with cellulose nitrate in the amount of 100% of the weight of the cellulose nitrate. It is also compatible with cellulose acetate in the amount of over 50% of the weight of cellulose acetate.

Example 5

The 2-chloro-4-nitrophenyl-n-butyl ether of diethylene glycol having the formula:

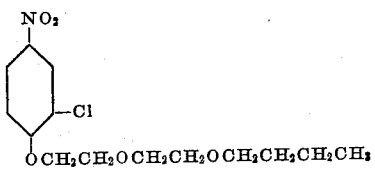

was made from 3,4-dichloronitrobenzene and diethylene glycol mono-butyl ether in a similar manner to Example 1. The product was an oil boiling at 208° C. to 210° C. at about 3 millimeters. The molecular weight agreed very closely with the theoretical for this compound. This ether is compatible with an equal weight of cellulose nitrate.

Example 6

The 4-bromo-2-nitrophenyl ethyl ether of diethylene glycol, having the formula:

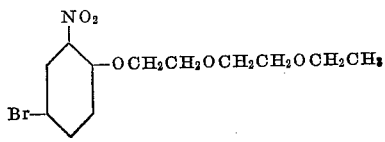

was made from 2,5-dibromonitrobenzene and diethylene glycol mono-ethyl ether in a similar manner to Example 1. The product was an oil boiling at 180° C. to 182° C. at about 2 millimeters and had the correct molecular weight for this compound. This ether was found to be compatible with an equal weight of cellulose nitrate and also with cellulose acetate when used in an amount not greater than 50% of the weight of cellulose acetate.

Example 7

The 2,4,5-trichloro-6-nitrophenyl ethyl ether of diethylene glycol, having the formula:

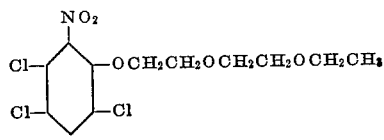

was made from 2,3,5,6-tetrachloronitrobenzene and diethylene glycol mono-ethyl ether.

|  | Weight | Mols |
|---|---|---|
|  | Grams |  |
| 2, 3, 5, 6-Tetrachloronitrobenzene | 65 | .25 |
| Diethylene glycol mono-ethyl ether | 167.6 | 1.25 |
| Potassium hydroxide (90% flakes) | 17 | .27 |

This preparation was run in a similar manner to Example 1 except that a lower reaction temperature was used. This reaction was run at 38° C. to 40° C. over a period of about 2 hours. Oxygen was passed through the reaction mixture continuously and the alkali was added in six portions, thus keeping the alkali concentration in the batch low at all times. The batch was worked up for recovery of the product. This ether is a straw-colored oil boiling at 180° C. to 185° C. at about 2 millimeters and has a molecular weight of 358 (theoretical, 358.5).

This ether is compatible with an equal weight of cellulose nitrate. The solubility of this ether in water was found to be about .003% at 25° C. Hence it is practically insoluble in water which is an advantage in its use as a plasticizer.

Example 8

The 2-methyl-3-chloro-4-nitrophenyl ethyl ether of diethylene glycol, having the formula:

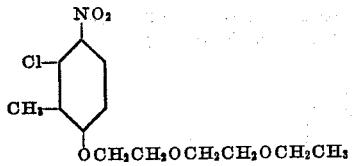

was made from 2,6-dichloro-3-nitrotoluene and diethylene glycol mono-ethyl ether in a manner similar to Example 1. The product was a yellow oil boiling at 191° C. to 193° C. at about 2 millimeters, and having the correct molecular weight for this compound. This ether is compatible with cellulose nitrate in an amount equal to 100% of the weight of cellulose nitrate.

Example 9

The 4-chloro-2-nitrophenyl 2-ethylbutyl ether of diethylene glycol, having the formula:

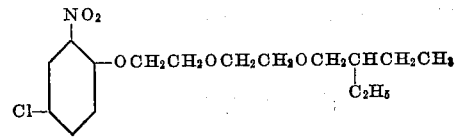

was made from 2,5-dichloronitrobenzene and diethylene glycol mono-2-ethylbutyl ether in a manner similar to Example 1. From 96 grams of 2,5-dichloronitrobenzene the yield of product was 146 grams of a pale yellow oil distilling chiefly at 192° C. to 194° C. at about 2 millimeters, and having approximately the correct molecular weight for this ether.

This ether is compatible with cellulose nitrate up to at least 100% of the weight of cellulose nitrate.

Example 10

The 2-nitrophenyl ethyl ether of diethylene glycol, having the formula:

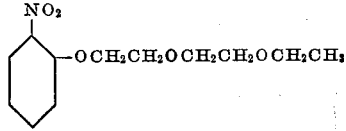

was made from orthonitrochlorobenzene and diethylene glycol mono-ethyl ether.

|  | Weight | Mols |
|---|---|---|
|  | Grams |  |
| Ortho-nitro chlorobenzene | 78.7 | 0.50 |
| Diethylene glycol mono-ethyl ether | 235 | 1.75 |
| Potassium hydroxide (90% flakes) | 38 | 0.60 |

This reaction was run similar to Example 1 except that a somewhat higher temperature was used. The first portion of alkali was added at 55° C. but most of the reaction was run at 66° C. to 70° C. Time of reaction was 4½ hours. After the reaction was completed the batch was worked up in the usual manner. The product was 110 grams of a pale yellow oil boiling at 151° C. to 153° C. at about 2 millimeters. This oil had the correct molecular weight for this compound and its solubility in water was found to be 0.26% by weight at about 25° C.

This ether was tested for compatibility with cellulose nitrate and cellulose acetate. It is compatible with cellulose nitrate up to at least 100% of the weight of the cellulose nitrate and with cellulose acetate up to at least 50% of the weight of cellulose acetate.

Example 11

The 4-nitrophenyl-n-butyl ether of diethylene glycol, having the formula:

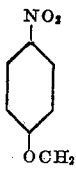

OCH₂CH₂OCH₂CH₂OCH₂CH₂CH₂CH₃ was made from para-nitrochlorobenzene and diethylene glycol mono-n-butyl ether in a manner similar to Example 10. From 78.7 grams of p-nitrochlorobenzene were obtained 116 grams of a yellow oil boiling at 182° C. to 184° C. at about 2 millimeters, and having a molecular weight of 282 (theoretical, 283).

Example 12

The 2-nitrophenyl methyl ether of diethylene glycol, having the formula:

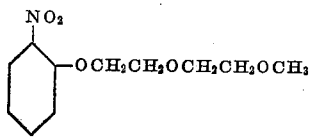

—OCH₂CH₂OCH₂CH₂OCH₃ was made from ortho-nitrochlorobenzene and diethylene glycol mono-methyl ether in a manner similar to Example 10. The product was an oil boiling at 153° C. to 155° C. at about 2 millimeters, and had the correct molecular weight for this compound. This ether was found to be compatible with cellulose nitrate in amount equal to 100% of the weight of the cellulose nitrate. Likewise it was found to be compatible with cellulose acetate in amount up to at least 100% of the weight of the cellulose acetate.

Example 13

The 2-nitrophenyl-(2-ethylbutyl) ether of diethylene glycol, having the formula:

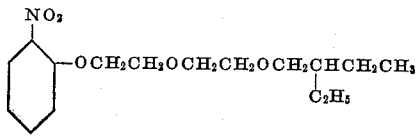

—OCH₂CH₂OCH₂CH₂OCH₂CHCH₂CH₃
                                        |
                                        C₂H₅ was made from ortho-nitrochlorobenzene and diethylene glycol mono-2-ethyl butyl ether in a manner similar to Example 10. The product was a straw-colored oil boiling at 183° C. to 185° C. at about 2 millimeters and had approximately the correct molecular weight for this ether.

Example 14

The 2-nitrophenyl ethyl ether of triethylene glycol, having the formula:

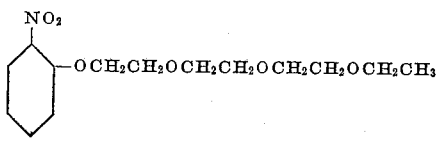

—OCH₂CH₂OCH₂CH₂OCH₂CH₂OCH₂CH₃ was made from ortho-nitrochlorobenzene and triethylene glycol mono-ethyl ether in a manner similar to Example 10. The product was 89 grams (from 52.5 grams of ortho-nitro chlorobenzene) of a light light yellow oil boiling at 175° C. to 177° C. at about 2 millimeters.

This ether is copatible with cellulose nitrate up to at least 100% of the weight of the cellulose nitrate. This ether is compatible with cellulose acetate up to at least 50% by weight on the cellulose acetate.

Example 15

The 4-chloro-2-nitrophenyl ethyl ether of dipropylene glycol, having the formula:

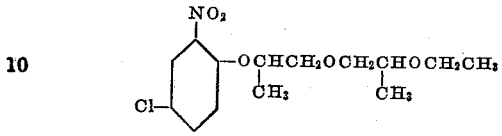

—OCHCH₂OCH₂CHOCH₂CH₃
   |             |
   CH₃           CH₃ was made from 2,5-dichloronitrobenzene and dipropylene glycol mono-ethyl ether in a manner similar to Example 1. The product was a yellow oil boiling at 160° C. to 163° C. at about 2 millimeters, and having the correct molecular weight for this compound. This ether is compatible with approximately an equal weight of cellulose nitrate and it is also compatible with vinyl butyral (XYNC) up to at leas 25% of the weight of the vinyl butyral.

Example 16

The 2-nitrophenyl ethyl ether of tetraethylene glycol, having the formula:

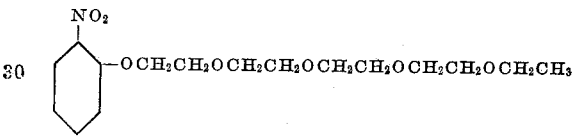

—OCH₂CH₂OCH₂CH₂OCH₂CH₂OCH₂CH₂OCH₂CH₃ was made from ortho-nitrochlorobenzene and tetraethylene glycol mono-ethyl ether in a manner similar to Example 10. The product was a yellow oil boiling at 196° C. to 203° C. at about 2 millimeters, and having a molecular weight (by the camphor method) of 341. The theoretical molecular weight of this ether is 343.

In carrying out the foregoing methods, an alkaline substance is employed to effect the condensation. This can be potassium hydroxide or sodium hydroxide or other strongly alkaline substance. The use of oxygen during the process is not essential and a fair yield may be obtained, in the preparation of some of the lower members of the series described herein, where oxygen is omitted. However, particularly in the preparation of the high members of the series, the use of oxygen or an oxygen-containing gas improves the yield and also the quality of the product. The ethers produced are lighter in color and of greater purity when oxygen is used.

These nitrophenylalkyl ethers of the lower polyalkylene glycols are useful as plasticizers and as components in plastic and high polymeric compositions. They are relatively low in volatility, stable over a wide range of temperatures, and due to the fact that they do not contain any ester groups, they are not subject to hydrolysis. The great majority of plasticizers now in use are esters, and as a result are subject to hydrolysis and saponification, particularly in the presence of certain zinc and lead pigments which are slightly basic in reaction.

The compounds of the present invention are practically insoluble in water but are soluble in alcohol, benzene and other common solvents, hence can easily be compounded into lacquers, paints, films, molded articles and similar compositions. The amount of plasticizer used may vary from about 5% to 70% or more of the weight of material being plasticized, depending upon each individual case.

The method of producing the compounds of our invention, as given in the examples, is effective, in general, only when a halogen to be replaced from the benzene nucleus is in a position either ortho or para to the nitro group. The compounds in which the —(O—ALK)—OR group is meta to the nitro group can be made from the corresponding nitrophenols or halonitrophenols by other appropriate methods; for example, by reacting the nitrophenol with the proper halide.

In general, the method given comprises mixing the halonitrobenzene and the proper polyalkylene glycol monoalkyl ether, heating the mixture to a temperature not over about 100° C., passing a current of oxygen or oxygen-containing gas through the solution or over the solution, and adding an alkaline material, preferably in a number of portions as the reaction progresses, thus avoiding having a high concentration of alkali in solution at any time during the reaction. An excess of the polyalkylene glycol monoalkyl ether is desirable in order to get complete reaction of the halonitrobenzene, though the excess need not be as large as given in some of our examples. For best results the concentration of alkali in the reaction-mixture during the reaction should be kept less than 1.0 normal and we prefer to keep it 0.5 N or less; that is, one milliliter of the reaction-mixture when titrated in an aqueous acetone solution to phenolphthalein indicator, should preferably take not over one milliliter of 0.5 N HCl solution to neutralize it. The oxygen or oxygen-containing gas is preferably passed into the reaction-mixture throughout the reaction, in order to keep an appreciable amount of oxygen in solution at all times. Keeping oxygen or an oxygen-containing gas under pressure over the solution also aids in keeping an appreciable amount of oxygen in solution in the reaction-mixture. This is to prevent reduction of the nitro group to azoxy or other reduction products.

The reaction-mixture should preferably be stirred during the entire run and we prefer to run the reaction at the lowest temperature at which a reasonably rapid rate of reaction will occur in any given case. This rate of reaction can be determined from titration of samples taken out at intervals. As can be seen from the examples we prefer a temperature of from 35° C. to 70° C. though lower and higher temperatures can be used. At too high a temperature, over about 100° C., the tendency to reduction and side-reactions is very great in most cases.

In view of the above, it will be seen that the several objects of the invention are achieved and other advantageous results attained.

As many changes could be made in the above processes and products without departing from the scope of the invention, it is intended that all matter contained in the above description shall be interpreted as illustrative and not in a limiting sense.

We claim:

1. A plasticizable organic substance and as a plasticizer therefor, a compound having the formula:

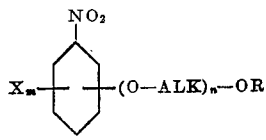

in which ALK represents a divalent aliphatic hydrocarbon radical containing not more than four carbon atoms, R represents an aliphatic hydrocarbon radical containing not more than eight carbon atoms, X represents a halogen selected from the group consisting of chlorine and bromine, $n$ represents a small whole number greater than one, $m$ represents a small whole number including zero and not greater than four.

2. Cellulose nitrate and a compound having the formula:

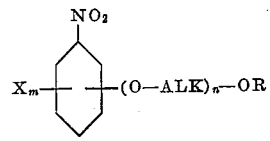

in which ALK represents a divalent aliphatic hydrocarbon radical containing not more than four carbon atoms, R represents an aliphatic hydrocarbon radical containing not more than eight carbon atoms, X represents a halogen selected from the group consisting of chlorine and bromine, $n$ represents a small whole number greater than one, and $m$ represents a small whole number including zero and not greater than four.

3. A vinyl resin and a compound:

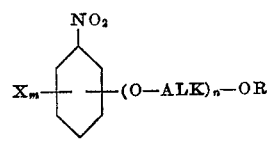

in which ALK represents a divalent aliphatic hydrocarbon radical containing not more than four carbon atoms, R represents an aliphatic hydrocarbon radical containing not more than eight carbon atoms, X represents a halogen selected from the group consisting of chlorine and bromine, $n$ represents a small whole number greater than one, and $m$ represents a small whole number including zero and not greater than four.

4. Cellulose acetate and a compound having the formula:

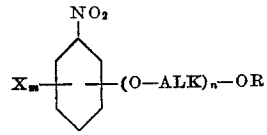

in which ALK represents a divalent aliphatic hydrocarbon radical containing not more than four carbon atoms, R represents an aliphatic hydrocarbon radical containing not more than eight carbon atoms, X represents a halogen selected from the group consisting of chlorine and bromine, $n$ represents a small whole number greater than one, and $m$ represents a small whole number including zero and not greater than four.

5. A compound having the formula:

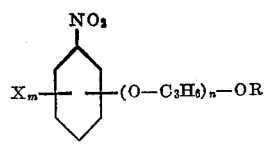

in which R represents an aliphatic hydrocarbon radical containing not more than eight carbon atoms, X represents a halogen selected from the group consisting of chlorine and bromine, $n$ represents a small whole number greater than one, $m$ represents a small whole number including zero and not greater than four.

6. A compound having the formula:

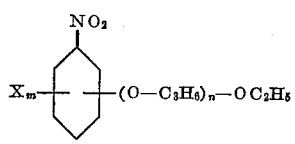

in which X represents a halogen selected from the group consisting of chlorine and bromine, $n$ represents a small whole number greater than one, $m$ represents a small whole number including zero and not greater than four.

GEORGE L. DOELLING.
KENNETH H. ADAMS.

REFERENCES CITED

The following references are of record in the file of this patent:

UNITED STATES PATENTS

| Number | Name | Date |
|---|---|---|
| 1,479,955 | Carroll | Jan. 8, 1924 |
| 2,056,261 | Dahlen | Oct. 6, 1936 |
| 2,166,917 | McCormack | July 18, 1939 |
| 2,221,911 | Dickey | Nov. 19, 1940 |
| 2,266,737 | Bruson | Dec. 23, 1941 |
| 2,294,228 | Derby | Aug. 25, 1942 |
| 2,326,702 | Taylor | Aug. 10, 1943 |

FOREIGN PATENTS

| Number | Country | Date |
|---|---|---|
| 195,313 | Germany | Feb. 11, 1903 |